Aug. 16, 1955  J. MacGREGOR  2,715,263
METHOD AND APPARATUS FOR WELDING METAL
Filed March 23, 1954

INVENTOR.
James MacGregor
BY
Webb, Mackey & Burden
HIS ATTORNEYS

United States Patent Office 2,715,263
Patented Aug. 16, 1955

2,715,263

METHOD AND APPARATUS FOR WELDING METAL

James MacGregor, Pittsburgh, Pa., assignor to York Engineering & Construction Company, Pittsburgh, Pa., a corporation of Pennsylvania Application March 23, 1954, Serial No. 418,085

7 Claims. (Cl. 29—477.7)

This application relates to method and apparatus for welding metal, particularly metals on whose surfaces oxides form rapidly upon exposure to the atmosphere. My inventions are particularly useful in continuously forming butt welded tubing, such for example as aluminum tubing.

A number of metals, such as copper and aluminum, oxidize on their surfaces very rapidly upon exposure to the atmosphere. Heretofore it has been very difficult, if not impossible, to weld such materials continuously because the oxide formed on their exposed surfaces which are brought together for welding prevent the formation of a proper weld. For example, it has not heretofore been feasible to make aluminum tubing or pipe by a butt welding process similar to that used in making steel pipe. Aluminum tubing has been and is now made by extrusion, a process which is relatively slow compared to the speed at which steel pipe can be butt welded and which requires considerably more expensive apparatus.

By my inventions, I am able to form butt welded aluminum tubing at a rate comparable to the manufacture of butt welded steel pipe or tubing and with apparatus which is comparable in cost to that required for making steel tubing. I am also able to do other welding operations with metals which have not been welded prior to my inventions because their surfaces oxidize rapidly upon exposure to the atmosphere.

In accordance with my inventions, I introduce metal to be welded into a non-oxidizing medium and carry on the entire welding operation in that medium. Before the actual welding is performed, I prepare the particular surfaces of the metal which are to be joined so that they are free of oxide. I carry this preparation on in the non-oxidizing medium so that after the surfaces are prepared they do not oxidize prior to the welding operation.

During the step of preparing the surfaces and subsequent thereto, I bring the metal to be welded up to a proper welding temperature. Thereafter, I press against each other the particular surfaces which are to be joined together and which have been prepared. After the welding is completed, I withdraw the finished article from the non-oxidizing medium.

I have also invented apparatus whereby the foregoing welding operations can be carried out.

As I have stated, my inventions can be used for carrying on a variety of welding operations on metals whose surfaces readily oxidize. In the remainder of the specification, I will describe my inventions with reference to the formation of butt welded aluminum tubing, but it is to be understood that my inventions are not to be limited to this particular welding operation or this particular metal.

The accompanying drawings show diagrammatically a present preferred embodiment of apparatus which I have invented for forming butt welded aluminum tubing. In these drawings.

Figure 1:
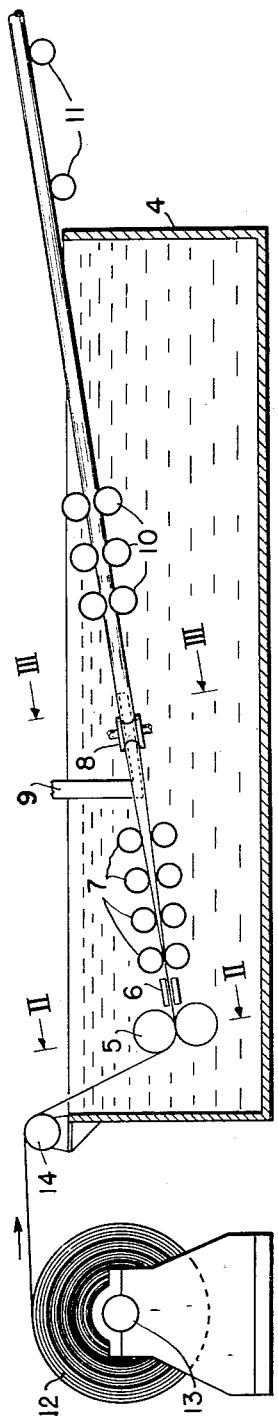
Figure 1 is a central vertical section through the apparatus.

My apparatus for forming aluminum tubing comprises a large container 4 which holds a liquid bath of molten lead. In this container and wholly submerged in the molten lead, I place the equipment for carrying on the operations of forming butt welded aluminum tubing. This equipment comprises pinch rolls 5, guides 6, conventional tube forming rolls 7, welding rolls 8, an L-shaped guide and mandrel 9, and sizing and reducing rolls 10. My apparatus also has table rolls 11 which support the formed tube after it is withdrawn from the lead bath.

The apparatus just described operates as follows. The leading end of a coil of aluminum strip 12, which coil is mounted on a rotatable shaft 13, is lead over a billy roll 14 through the pinch rolls 5 which pull the strip from the coil 12 and feed it through the guides 6 to the first pair of a series of conventional forming rolls 7.

Figure 2:
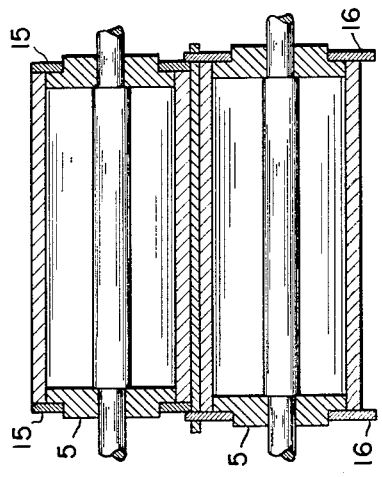
Figure 2 is a section along the lines II—II of Figure 1.

These pinch rolls not only feed the strip from the coil to the first pair of the series of forming rolls 7, but they also trim the edges of the strip. As shown in Figure 2, the pinch rolls 5 carry at their ends cooperating shearing discs 15 and 16 which trim both edges of the strip in the same manner as conventional rotary slitting machines. By thus shearing the edges of the strip in the bath of molten lead, I prepare fresh non-oxidized edge surfaces on which aluminum oxide will not form so long as the strip is submerged in the lead bath.

The strip passes through the guide 6 to the first of a series of conventional tube forming rolls 7 which bend the strip transversely into the form of a tube. The last of the series of forming rolls does not completely form the tube, that is the two edges of the strip are not brought against each other, but they leave a narrow opening into which the vertical portion of the combined guide and mandrel 9 extends. The vertical portion of the guide and mandrel holds the partially formed tube in position so that when the tube is passed into the welding rolls the edges of the strip will be in line with the welding rolls 8.

Figure 3:
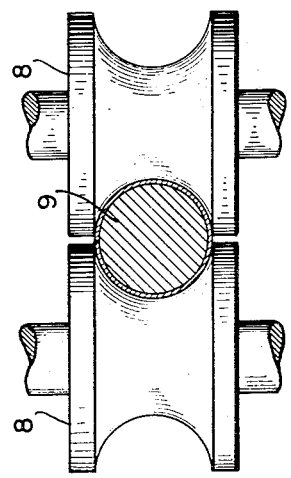
Figure 3 is a section along the lines III—III of Figure 1.

As shown in Figure 3, the welding rolls press the two edges of the strip against each other so as to weld these two edges to each other. By the time the strip has reached the welding rolls, it has been heated by the lead bath to a proper welding temperature for aluminum. The mandrel portion of the combined guide and mandrel 9 extends inwardly from the guide portion through the pass formed by the welding rolls and extends slightly beyond this pass. During the welding operation, it supports the interior of the tube and prevents it from collapsing inwardly when the welding rolls press the edges of the aluminum strip together.

After the welding operation just described, the formed tube passes through conventional tube sizing and reducing rolls 10 and then passes upwardly out of the bath on the table rolls 11.

From the foregoing, it is apparent that I have invented method and apparatus for making butt welded aluminum tubing which which is continuous and which has a production rate comparable to the rate at which butt welded steel tubing is formed. The equipment involved is considerably less in cost than that required for making aluminum tubing by the extrusion process.

While my invention has been described with particular reference to the manufacture of butt welded aluminum tubing, it will be understood that my invention is applicable to the welding of other metals whose surfaces oxidize rapidly on exposure to atmosphere and the carrying on of other kinds of welding operations in which two surfaces of metal are secured to each other by welding.

While I have described a present preferred embodiment of my invention, it is to be understood that it may be embodied within the scope of the appended claims.

I claim:

1. A process of welding metal which comprises surrounding the metal to be welded with a non-oxidizing medium, preparing non-oxidized surfaces on the metal, heating the metal up to welding temperature, pressing the non-oxidized surfaces together and thereafter removing the metal from the non-oxidizing medium.

2. A process of welding metal which comprises surrounding the metal to be welded with a non-oxidizing medium, removing portions of the surface of the metal to form non-oxidized surfaces suitable for welding, heating the metal up to the welding temperature, pressing the non-oxidized surfaces together and thereafter removing the metal from the non-oxidizing medium.

3. A process of forming metal tubing which comprises introducing a flat strip of metal into a non-oxidizing medium, trimming the edges of the strip to form two non-oxidized surfaces, bending the strip transversely to form a partially completed tube with the edges facing but spaced from each other, bringing the strip up to welding temperature, pressing the edges of the strip together when the strip is at welding temperature and thereafter removing the formed tube from the non-oxidized medium.

4. A process of welding metal which comprises dipping the metal into a liquid bath having a temperature sufficiently high to heat the metal to welding temperature, preparing non-oxidized surfaces on the metal, pressing the non-oxidized surfaces together when the metal has reached welding temperature and thereafter removing the metal from the liquid bath.

5. A process of forming metal tubing which comprises immersing a flat strip of metal into a liquid bath having a temperature sufficiently high to heat the strip to welding temperature, trimming the edges of the strip to form two non-oxidized surfaces, bending the strip transversely to form a partially completed tube with the edges facing but spaced from each other, bringing the strip up to welding temperature, pressing the edges of the strip together when the strip is at welding temperature and thereafter removing the formed tube from the liquid bath.

6. Apparatus for welding metal comprising a container adapted to hold a non-oxidizing medium at a temperature sufficient to heat the metal to be welded to a welding temperature, means for feeding metal to be welded into said container, means within the container for removing portions of the surface of the metal to prepare non-oxidized surfaces on the metal suitable for welding, means for pressing said non-oxidized surfaces together when the metal has attained welding heat and means for withdrawing the metal from the container.

7. Apparatus for welding metal tubing comprising a liquid bath adapted to be heated to a temperature sufficient to heat the metal forming the tubing to a welding temperature, means for feeding a metal strip into the bath, means in the bath for trimming the edges of the strip, means for forming the strip into a tube, means for pressing the edges of the tube together when the strip has reached welding temperature, and means for withdrawing the formed tube from the bath.

No references cited.